United States Patent
Irani et al.

[15] 3,671,644
[45] June 20, 1972

[54] ANTISEPTIC COMPOSITIONS CONTAINING PHENOLIC BACTERICIDES POTENTIATED WITH PHOSPHONIC ACID DERIVATIVES

[72] Inventors: Riyad R. Irani; H. Evan Roberts, both of St. Louis, Mo.

[73] Assignee: Monsanto Chemical Company, St. Louis, Mo.

[22] Filed: July 18, 1969

[21] Appl. No.: 872,437

Related U.S. Application Data

[63] Continuation of Ser. No. 352,942, March 18, 1964.

[52] U.S. Cl..............................424/346, 252/8.5, 252/106, 424/204, 424/329
[51] Int. Cl....................................A61k 27/00, A61k 13/00
[58] Field of Search...........................424/204, 346

*Primary Examiner*—Sam Rosen
*Attorney*—Richard W. Sternberg and Roger R. Jones

[57] ABSTRACT

An antiseptic composition is described containing a phenolic or quaternary ammonium bactericide and, as a potentiating agent, a water-soluble polyphosphonic acid compound having the formula

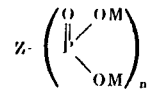

wherein $n$ is an integer from 2 to 3 inclusive, M is a member selected from the group consisting of hydrogen and cations, and Z is a connecting radical equal in valence to $n$ and containing not more than about 12 atoms, exclusive of hydrogen, in chemical combination, as well as compositions containing the foregoing and other additives such as are found in sanitizing compositions, antiseptic detergent compositions, cosmetic compositions, drilling mud compositions and the like.

5 Claims, No Drawings

ANTISEPTIC COMPOSITIONS CONTAINING PHENOLIC BACTERICIDES POTENTIATED WITH PHOSPHONIC ACID DERIVATIVES

This case is a continuation of applicants' parent application, Ser. No. 352,942 filed Mar. 18, 1964.

This invention relates to improved antiseptic compositions and more particularly to the use of potentiating agents which are capable of improving the performance of phenolic and quaternary ammonium bactericides and the compositions resulting therefrom.

In many applications where phenolic and quaternary ammonium bactericides are useful, it is oftentimes desirable to either increase the bactericidal activity of the bactericide without increasing its concentration or to decrease the concentration of the bactericide without imparing its efficiency. In addition, in many applications where the bactericide is formulated with many other additives, such as surfactants, wetting agents and the like, for example, as in sanitizing compositions, antiseptic detergent and cosmetic compositions, and the like, the additives, although compatible with the bactericide may mask or impair its activity, thereby requiring greater amounts of the bactericide in order to achieve the desired degree of activity. As can be appreciated, therefore, a potentiating agent which is capable of improving the performance agent which is capable of improving the performance of the bactericide in applications such as those described above would represent an advancement in this art.

It is, therefore, an object of this invention to provide an improved antiseptic composition.

It is a further object of this invention to provide a potentiating agent which improves the activity of the phenolic and quaternary ammonium bactericides.

It is still a further object of this invention to provide a potentiating agent which improves the activity of the phenolic and quaternary ammonium bactericides in the presence of additives such as are found in sanitizing compositions, antiseptic detergent compositions, cosmetic compositions, drilling mud compositions and the like.

These and other objects will become apparent from a reading of the following detailed description.

It has been found that phenolic and/or quaternary ammonium bactericides can be improved in performance or bactericidal activity by the use of a polyphosphonic acid compound as a potentiating agent, said compound having the following formula

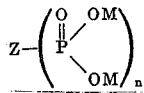

wherein n is an integer from 2 to 3 inclusive, M is a member selected from the group consisting of hydrogen and cations, and Z is a connecting radial equal in valence to n and containing not more than about 12 atoms, exclusive of hydrogen, in chemical combination. The chemical nature of the connecting radical is relatively unimportant and can include such radicals as hydrocarbyl radicals, hydrocarbyl substituted amine radicals, hydrocarbyloxy radicals, and the like. Preferably Z is an alkylidene radical, a halo-substituted alkylidene radical (especially chloro), a hydroxy-substituted alkylidene radical, a dialkylidene amine radical or a trialkylidene amine radical, and especially an alkylidene radical or a trialkylidene amine radical. Especially preferred are the connecting radicals wherein the alkylidene radical contains about 9 carbon atoms or less and more especially preferred for the alkylidene amine radicals are the symmetrical alkylidene amine radicals. In addition, the term "cation" means, as used herein, the alkali metal ions, ammonium ions and amine ions.

Of the polyphosphonic acids, the amino tri-(lower alkylidene phosphonic acids) as well as their water-soluble salts and the lower alkylidene diphosphonic acids as well as their water-soluble salts are preferred.

The amino tri(lower alkylidene phosphonic acids) have the following formula

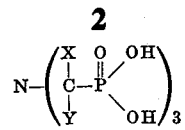

wherein X and Y are members selected from the group consisting of hydrogen and lower alkyl (1–4 carbon atoms).

The lower alkylidene diphosphonic acids have the following formula

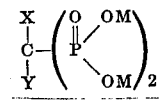

wherein X is a member selected from the group consisting of hydrogen and lower alkyl (1–4 carbon atoms) and Y is a member selected from the group consisting of hydrogen, hydroxyl and lower alkyl (1–4 carbon atoms).

Amino tri(lower alkylidene phosphonic acid) compounds illustrative of the invention include:

1. amino tri(methylene phosphonic acid)
2. amino tri(ethylidene phosphonic acid)
3. amino tri(isopropylidene phosphonic acid)
4. amino di(methylene phosphonic acid) mono(ethylidene phosphonic acid)
5. amino di(methylene phosphonic acid) mono(isopropylidene phosphonic acid)
6. amino mono(methylene phosphonic acid) di(ethylidene phosphonic acid)
7. amino mono(methylene phosphonic acid) di(isopropylidene phosphonic acid).

Lower alkylidene diphosphonic acid compounds illustrative of the invention include:

1. methylene diphosphonic acid
2. ethylidene diphosphonic acid
3. isopropylidene diphosphonic acid
4. 1-hydroxy, ethylidene diphosphonic acid
5. 1-hydroxy, propylidene diphosphonic acid
6. butylidene diphosphonic acid.

The amino tri(lower alkylidene phosphonic acids), as well as their salts, may be prepared by various means, one of which comprises as a first step the preparation of the corresponding ester by the following general reaction:

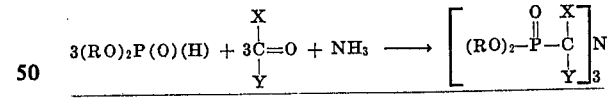

wherein X and Y are the same as in the foregoing general formula (2) and R represents an alkyl group.

The free amino tri(lower alkylidene phosphonic acids) and their salts may be prepared by hydrolysis of the ester using strong mineral acids such as hydrochloric acid and the like.

The lower alkylidene diphosphonic acids and their salts may be prepared by various means, one of which comprises as a first step the preparation of the corresponding ester by the following general reactions:

1. For the alkylidene diphosphonic acids and their salts.

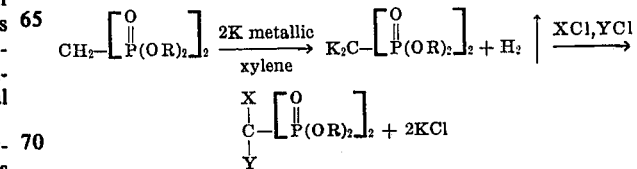

2. For the methylene diphosphonic acid and its salts.

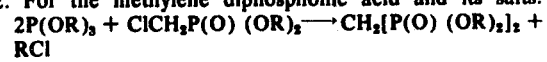

3. For the 1-hydroxy alkylidene diphosphonic acids and their salts. XC(O)P(O)(OR)₂ + HP(O)(OR)₂ ⇌ XC(OH) [P(O)(OR)₂]₂ wherein X and Y are the same as in the foregoing general formula (3) and R represents an alkyl group.

The free lower alkylidene diphosphonic acids and their salts may be prepared by hydrolysis of the ester using strong mineral acids such as hydrochloric acid and the like.

Although the polyphosphonic acid compounds are suitable for use in antiseptic compositions, the water-soluble salts of the phosphoric acid compounds are, in general, preferred in practicing the present invention. Of the salts of the amino tri(lower alkylidene phosphonic acid) compounds, the penta-metal and di-metal salts are preferred, especially the penta-alkali metal and di-alkali metal salts and in particular, the penta-sodium and di-sodium salts, although other alkali metal salts, such as potassium, lithium and the like, as well as mixtures of the alkali metal salts, may be substituted therefore. Of the salts of the lower alkylidene diphosphonic acid compounds, the tetra-alkali metal salts are preferred, especially the tetra sodium, although other alkali metal salts, such as potassium, lithium and the like, as well as mixtures of the alkali metal salts may be substituted therefore. Other water-soluble acid salts which may be employed in practicing the present invention include the ammonium salts and amine salts, particularly when the amine is a low molecular weight amine, i.e., having a molecular weight below about 200, and more particularly the alkyl amines, alkylene amines, and alkanolamines containing not more than 2 amine groups. In general, the salts may be prepared by neutralizing the polyphosphonic acid compounds with a base that contains essentially the desired cation. For example, to prepare the disodium salt, one of the polyphosphonic acid compounds can be neutralized with a stoichiometric amount of a base containing the sodium cation, such as NaOH, Na₂CO₃, and the like.

As previously mentioned, the potentiating agents of the present invention can be used with any of the conventional phenolic and quaternary ammonium type bactericides.

The phenolic type bactericides include many compounds which are considered phenolic derivatives and which are believed to function either as a gross protoplasmic poison or by the inactivation of essential enzyme systems. Such bactericides include phenol and the following phenolic derivatives including the salts thereof and particularly the sodium salts:

1. Alkyl phenols which include the following:
    butylphenol
    amylphenol
    heptylphenol
    octylphenol
2. Bis-phenols including the halogen substituted bis-phenols which include the following:
    2,2'-methylene bis(4-chlorophenol)
    2,2'-methylene bis(4,6-dichlorophenol)
    2,2-methylene bis(3,4,6-trichlorophenol)
    2,2-thio bis(4,6-dichlorophenol)
    2,2-thio bis(3,4,6-trichlorophenol)
    2,2'-methylene bis(3-trifluoro methyl-4-chlorophenol)
    2,2'-methylene bis(4-chloro-3,5-xylenol)
    6,6'-methylene bis(4-chloro-α-phenyl-o-cresol)
    2,2'-ethylidene bis(3,4,6-trichlorophenol)
3. Bis(hydroxyphenyl) alkanes which include the following:
    1,3 bis(p-hydroxyphenyl) butane
    1,3 bis(p-hydroxyphenyl) octane
    4,6 bis(p-hydroxy phenyl) nonane
    bis(p-hydroxyphenol) methylene
    bis (p-hydroxyphenyl) ethylene
    bis (p-hydroxyphenyl) hexamethylene
4. Halogenated phenolics which include the following:
    p-chlorophenol
    3-methyl-p-chlorophenol
    3,5-dimethyl-p-chlorophenol
    6-ethyl-3-methyl-p-chlorphenol
    6-diethylmethyl-3-methyl-p-chlorophenol
    o-benzyl-p-chlorophenol
    o-benzyl-m,m-dimethyl-p-chlorophenol
    o-phenylethyl-p-chlorophenol
    o-chlorophenol
    n-propyl-o-chlorophenol
    n-amyl-o-chlorophenol
    tert amyl-o-chlorophenol
    p-bromophenol
    methyl-p-bromophenol
    n-propyl-bromophenol
    n-hexyl-bromophenol
    o-bromophenol
    tert amyl-o-bromo phenol
    n-hexyl-o-bromo phenol
    pentachlorophenol
    2,4,6-trichloro phenol
5. Dihydric phenolic derivatives which include the following:
    resorcinol
    methyl resorcinol
    n-amyl resorcinol
    n-heptyl resorcinol
    n-nonyl resorcinol
    phenyl resorcinol
    benzyl resorcinol
    p-chlorobenzyl resorcinol
    4-n-butyl resorcinol
6. Trihydric phenolic derivatives which include the following:
    4-n-hexylpyrogallol
    4-n-octyl pyrogallol
    4-n-heptyl pyrogallol
    4-n-heptneyl pyrogallol
    benzyl pyrogallol
    phenyl propyl pyrogallol
7. Hydroxy carboxylic acids and esters which include the following:
    propyl p-hydroxy benzoate
    butyl p-hydroxy benzoate
    o-hydroxy benzoic acid
    m-hydroxy benzoic acid
    3-nitro-4-hydroxy benzoic acid
8. Nitrophenols which include the following:
    m-nitrophenol
    p-nitrophenol
    o-nitrophenol
    2,4-dinitrophenol
    2,5-dinitrophenol
    2,4,6-trinitrophenol
9. Aminophenols which include the following:
    p-aminophenol
    o-aminophenol
    ethyl-p-amino phenol
    2,4-diamino phenol
10. Naphthol derivatives which include the following:
    alpha naphthol
    beta naphthol
    tribromo naphthol
    tetrabromo naphthol Quaternary ammonium bactericides which are suitable are preferably cationic surface-active compounds in which one substituent on the quaternary ammonium nitrogen is lipophilic and the lipophilic group forms part of the cation when the compound is dissolved in water. In addition, these compounds are believed to function as bactericides by their effect on the metabolism or respitory system of the microorganism. Such bactericides include the following:

1. Lipophilic group directly attached to the quaternary ammonium nitrogen such as those derived from naturally occuring fatty acids which include the following:
    dimethyl-decyl-benzyl ammonium chloride
    diethyl-dodecyl-benzyl ammonium bromide
    dimethyl-dodecyl-benzyl ammonium bromide
    allyl-dibutyl-dodecyl ammonium bromide
    methyl-diallyl-dodecyl ammonium iodide
    diethyl-acetonyl-dodecyl ammonium chloride dimethyl-benzyl-dodecyl ammonium chloride
dimethyl-tridecyl-benzyl ammonium chloride
diethyl-pentadecyl-benzyl ammonium bromide
dipropyl-phenylethyl-dodecyl ammonium bromide
dimethyl-decyl-dimethylbenzyl ammonium chloride
dimethyl-dodecyl-dimethylbenzyl ammonium chloride
dimethyl-octadecyl-dimethylbenzyl ammonium chloride
dimethyl-decyl-ethylbenzyl ammonium chloride
dimethyl-dodecyl-ethylbenzyl ammonium chloride
dimethyl-hexadecyl-ethbenzyl ammonium chloride
trimethyl-decyltolylmethyl ammonium chloride
trimethyl-tetradecyltolylmethyl ammonium chloride
trimethyl-tetradecyl ammonium chloride
dimethyl-didecyl ammonium chloride
dimethyl-ditetradecyl ammonium chloride
dimethyl-didodecyl ammonium chloride 2. Lipophilic groups attached to quaternary ammonium nitrogen through amide linkage which includes the following:
N-trimethyl-N-chloro-N'-dodecyl-glycinamide
N-trimethyl-N-chloro-N'benzyl-N'-dodecylglycinamide
N-methyl-N-benzyl-N-cyclohexyl-N-chloro-dodecyl-glycinamide
N-methyl-N-benzyl-N-cyclohexyl-N-chloro-N'-dodecyl-glycinamide
N-pentyl-N-benzyl-N-chloro-dodecyl-glycinamide 3. Lipophilic group attached to quaternary ammonium nitrogen through ester linkage which includes the following:
N-diethyl-N-benzyl-N-(para-cetyl aminophenoxyethyl)-ammonium chloride
diethyl-N-benzyl-N-(3-butyloxyphenoxyethyl)-ammonium chloride
N-diethyl-N-benzyl-N-(3-n-octyloxyphenoxyethyl)-ammonium chloride
N-diethyl-N-benzyl-N-(n-octyloxyphenthioethyl)-ammonium chloride
N-diethyl-N-benzyl-N-(3-octylthiophenoxyethyl)-ammonium chloride
N-diethyl-N-benzyl-N-(3-butyl amino-4-cresyloxy-ethyl)-ammonium chloride
methyl-cyclohexyl-ethyl-($\alpha$-dodecyloxy-$\beta$-hydroxypropyl)-ammonium iodide
trimethyl-n-octyl oxyethyl ammonium bromide
methyl-diethyl-decyloxyethyl-ammonium iodide 4. Lipophilic group attached to quaternary ammonium nitrogen through ether linkage which includes the following:
benzyldimethyl-{2-[2-(m-methyl-p-1,1,3,3-tetramethylbutyl phenoxy) ethoxy]ethyl}ammonium chloride
benzyl dimethyl- { 2[2(p-1,1,3,3-tetramethyl butyl phenoxy) ethoxy]ethyl} ammonium chloride 5. Lipophilic group attached to quaternary ammonium nitrogen through a sulfur linkage which includes the following:
trimethyl-dodecylthiomethyl-ammonium chloride
tributyl-dodecylthiomethyl-ammonium chloride
dimethyl-hydroxyethyl-dodecylthio-methyl-ammonium chloride
trihydroxyethyl-dodecylthiomethyl-ammonium chloride
methyl-diethyl-octyl thioethyl-ammonium iodide 6. Lipophilic group attached to quaternary ammonium nitrogen through heterocyclic ring structure which includes the following:
2-(2-methylnonyl)pyridine sulfate
2-(2-methyl decyl)pyridine sulfate
2-(2-methyl dodecyl)pyridine sulfate
2-tridecyl pyridine sulfate
2-heptadecyl pyridine sulfate
2-(2-methyl hexadecyl)pyridine sulfate
2-dodecyl isoquinolinium bromide
1-hexadecyl pyridinium chloride
2-octyl-1-(2-hydroxyethyl)-imidazolinium chloride
2-dodecyl-1-(2-hydroxyethyl)-imidazolinium chloride
2-tetradecyl-1-(2-hydroxyethyl)-imidazolinium chloride
6-hexyloxy benzyl quinolinium chloride
6-benzyloxy-benzyl-quinolinium chloride
6-dodecyloxy-benzyl-quinolinium chloride
7-dodecyloxy-benzyl-quinolinium chloride
benzyl-decyl-piperidinium bromide
benzyl-decyl-pyperidinium chloride
N-crotyl-N-octadecylpiperidinium bromide The amounts of the potentiating agents which are suitable for improving the activity of the phenolic and/or quaternary ammonium bactericides depend upon, inter alia, the end use application and desired degree of potentiation. In general, the amounts preferred on a weight ratio of bactericide to potentiating agent are from about 1:100 to 10:1.

The invention is not to be limited to any particular method of preparing the antiseptic composition. The potentiating agent and bactericide can be admixed in any of the forms in which they are manufactured, as well as being added simultaneously or separately to an aqueous solution. In any event, the potentiating agent is intended to be used with the bactericide at the time of application of the bactericide.

The resulting antiseptic composition, that is, the potentiating agent and the bactericide, of the present invention is generally effective when used in conventional amounts such as are normally used for the phenolic and/or quaternary ammonium compounds and which, of course, varies depending upon, inter alia, the end use application, types of microorganism which are to be inactivated and the like. Although the phenolic and quaternary ammonium compounds are termed herein as bactericides, that is, an agent capable of killing both pathogenic and non-pathogenic bacteria, such compounds can, in most cases, be used in concentrations which can inhibit or prevent the growth of such bacteria and, therefore, the resulting composition is antiseptic, that is, when applied to microorganisms will render them innocuous either by killing them or preventing their growth.

The following examples are presented for illustrative purposes with parts by weight being given unless otherwise indicated.

EXAMPLE 1

Into a conventional 3-necked, 3-liter flask fitted with a reflux condenser, stirrer and thermometer are added about 600 parts of diethyl phosphite and about 127.5 parts of 29 percent aqueous ammonia solution. The flask is placed in an ice bath and after the mixture becomes cooled to about 0° C about 325 parts of 37 percent aqueous formaldehyde solution are added. The flask is removed from the ice bath and heated with the reaction occurring at about 100° C. After the reaction is completed the flask is allowed to cool to room temperature and the reaction products are extracted with benzene and separated by fractional distillation. Hexaethyl aminotri(methylene phosphonate) distills between 190°–200 °C at a pressure of .1 mm and is obtained in a quantity of about 184 parts. The following are the results to enable a comparison between the calculated % constituents and found % constituents:

| | | | | |
|---|---|---|---|---|
| Calculated | 36.87% C, | 7.30% H, | 3.53% N, | 20.01% P |
| Found | 38.54% C, | 7.76% H, | 3.00% N, | 19.89% P |

The free acid, amino tri(methylene phosphonic acid), $N(CH_2P(O)(OH)_2)_3$, is prepared by hydrolysis of a portion of the foregoing prepared ester. In a flask similar to that described above 40 grams of the ester is refluxed with about 200 ml of concentrated hydrochloric acid for a period of about 24 hours. The free acid, a sirupy liquid, crystallizes on prolonged standing (about 1 week) in a dessicator. The yield is 20 grams. The equivalent weight of the free acid, by titration, is found to be 62 as compared with the calculated value of 59.8.

EXAMPLE 2

In a reaction vessel about 299 parts of amino tri(methylene phosphonic acid) are added to about 800 parts of a 10 percent by weight sodium hydroxide solution and the resulting reaction product evaporated to dryness at about 130° C. The resulting product is disodium amino tri(methylene phosphonate).

EXAMPLE 3

Into a reaction vessel are charged about 18.6 parts of diethyl chloromethylphosphonate and about 32.2 parts of triethyl phosphite. This mixture is stirred and heated to reflux. A bubbler attached to the otherwise closed system checks the ethyl chloride evolution. At 160° C the ethyl chloride comes off at a steady rate. After 17 hours of refluxing, the temperature reaches about 220° C and the gas evolution becomes quite slow. The mixture is cooled to room temperature and vacuum distilled. The tetraethyl methylenediphosphonate, $(C_2H_5O)_2$—$OPCH_2PO(OC_2H_5)_2$, boils at 128–9°/.9 mm with a yield of 77% based on the diethyl chloromethylphosphonate reactant. The free acid, methylene diphosphonic acid, $H_2C(P(O)(OH)_2)_2$, is prepared by hydrolysis of a portion of the foregoing prepared ester. In a flask similar to that described above 80 grams of the ester is refluxed with about 400 ml of concentrated hydrochloric acid for a period of about 24 hours. The free acid, a sirupy liquid, crystallizes on prolonged standing (about 1 week) in a dessicator.

EXAMPLE 4

In a reaction vessel about 178 parts of methylene diphosphonic acid are added to about 800 parts of a 10% by weight sodium hydraulic solution and the resulting reaction product evaporated to dryness at about 130° C. The resulting product is disodium methylene diphosphonate.

EXAMPLE 5

Into a reaction vessel are charged about 60 parts of diethyl acetyl phosphonate and about 46 parts of diethyl phosphonate and treated with a catalytic amount of sodium ethoxide in ethanol. The reaction is exothermic with the temperature rising to about 70° C. The reaction product, tetra ethyl 1-hydroxy ethylidene diphosphonate, $CH_3C(OH)[P(O)(OC_2H_5)_2]_2$, has a melting point at about 38–39° C. The free acid, 1-hydroxy, ethylidene diphosphonic acid, $CH_3C(OH)[P(O)(OH)_2]_2$, is prepared by hydrolysis of a portion of the foregoing prepared ester. In a reaction vessel about 20 grams of the ester and about 100 ml of concentrated hydrochloric acid is heated at about 100° C for about 2 hours. The free acid is dried in a rotary vacuum evaporator to form crystals.

EXAMPLE 6

In a reaction vessel about 209 parts of 1-hydroxy ethylidene diphosphonic acid are added to about 800 parts of a 10 percent by weight of sodium hydroxide solution and the resulting reaction product evaporated to dryness at about 130° C. The resulting product is disodium 1-hydroxy, ethylidene diphosphonate.

The polyphosphonic acid compounds of the present invention are good detergent builders, sequestering agents, and deflocculating agents, and have the added advantages of being stable, dry, free flowing compounds which are relatively water soluble and are hydrolytically stable, that is, resistant to hydrolysis or degradation under various pH and temperature conditions. Therefore, such compounds can advantageously be utilized as potentiating agents as well as taking advantage of their foregoing described properties in many and various applications where bactericides are used.

The potentiating agents of the present invention have the added advantage of improving the activity of the phenolic bactericides in the presence of anionic, nonionic and/or amphoteric surface active agents which are suitable as cleansing agents as well as improving the activity of quaternary ammonium bactericides in the presence of nonionic surface active agents which are suitable as cleansing agents.

Anionic surface active compounds can be broadly described as compounds which contain hydrophilic and lyophilic groups in their molecular structure and which ionize in an aqueous medium to give anions containing the lyophilic group. These compounds are usually soap i.e., an alkali metal or amine salt of a fatty acid and/or fatty acid mixture, the alkali metal salts of organic sulfonates or sulfates, particularly the sodium salts, such as alkyl aryl sulfonates (e.g. sodium dodecyl benzene sulfonate), sulfate of straight chain primary alcohols (e.g., sodium lauryl sulfate) and the like. Nonionic surface active compounds can be broadly described as compounds which do not ionize but acquire hydrophilic characteristics from an oxygenated side chain, usually polyoxyethylene, while the lyophilic part of the molecule may come from fatty acids, phenols, alcohols, amides or amines. For example purposes only, the polyethylene oxide condensates of alkyl phenols (e.g. condensation product formed from 1 mole nonyl phenol and 10 moles ethylene oxide), the condensation products of aliphatic alcohols and ethylene oxide (e.g. condensation product formed from 1 mole tridecanol and 12 moles ethylene oxide) are suitable nonionic surface active compounds in practicing the invention. Amphoteric surface active compounds can be broadly described as compounds which have both anionic and cationic groups in the same molecule. Examples of such compounds include sodium N-methyl taurate and sodium N-coco beta amino propinate.

Further the potentiating agents of the present invention have the added advantage of improving the the activity of the phenolic and quaternary ammonium bactericides in the presence of inorganic builder materials which are usually found in sanitizing and antiseptic detergent compositions, and which are usually comprised of inorganic phosphates, carbonates, sulfates, hydroxides, silicates or combinations thereof, and, in particular, the alkali metal salts of the foregoing materials. The alkali metal salts are preferably the potassium and sodium salts, although ammonium salts may be employed, particularly in combination with the potassium or sodium salts. The phosphate compounds are preferably the chain polyphosphates. Such polyphosphates contain more than 1 phosphorus atom per molecule, as distinguished from orthophosphates which contain only one phosphorus atom per molecule. Chain polyphosphates are non-cyclic (and usually linear) phosphates, as distinguished from ring or cyclic phosphates such as trimetaphosphates and tetrametaphosphates. Examples of the more common chain polyphosphates are tetrapotassium pyrophosphate, tetrasodium pyrophosphate, sodium tripolyphosphate, potassium hexametaphosphate and sodium hexametaphosphate. It should be noted, however, that with most quaternary ammonium bactericides the pyrophosphates are the only chain polyphosphates which can advantageously be used.

Other additives which can be utilized are the water-soluble sodium and potassium silicates. As is well-known, sodium silicates can vary quite widely in composition, ranging from tetra and disilicates having a mole ratio of $Na_2O:SiO_2$ of 1:4 and 1:2, respectively, to the more alkaline silicates, such as the orthosilicate having a mole ratio of $Na_2O:SiO_2$ of 2:1. In general, sodium silicate ($Na_2O:SiO_2 = 1:2$) is the preferred silicate compound for use according to the present invention. However, other silicates, or mixtures of silicates, having an overall mole ratio of $Na_2O:SiO_2$ between about 1:1 and 1:4 can be used. The carbonates, hydroxides and sulfates are preferably the sodium and potassium carbonates, hydroxides and sulfates.

As previously mentioned, the potentiating agents of the present invention also exhibit the ability to deflocculate finely divided solid material in an aqueous medium and can advantageously be used, along with bactericides, in drilling mud compositions which contain other additives, such as starch and the like, which are subject to degradation or decay by micro-organisms.

The drilling mud compositions contain, as the mud additive, any conventional type clay material such as hydratable clay or colloidal clay bodies which are capable of being deflocculated or dispersed in an aqueous vehicle and in particular the bentonite type clay consisting of the Montmorillonite minerals i.e., Montmorillonite, Beidellite, Nontromite, Hectorite and Saponite. Such clay materials as Wyoming bentonite, commercial medium-yield drilling clays mixed in various parts of the country such as Texas, Tennessee, and Louisiana are among those which are frequently encountered. Weighting material added to increase specific gravity such as barytes, iron oxide, calcium carbonate, silica and the like may also be included. The aqueous vehicle may be any type of suitable fresh or salt water such as is obtained from wells, lakes or the sea. In addition, the drilling mud compositions of the invention may contain other additives, such as caustic, starch (corn or modified soya bean), carboxymethylcellulose, co-polymers of ethylene and maleic anhydride, sodium hexametaphosphate, lignosulfonates, quebracho, lime, cement, gypsum and the like.

The compositions containing the bactericide and potentiating agent, as well as the other additives, such as the surfactants, inorganic materials, clays for drilling mud compositions, and the like, are generally effective in aqueous systems in conventional amounts and depending upon the particular composition and the particular application the optimum amounts can readily be determined by simple tests. Usually concentrations of bactericide between about 0.001 percent to about 10 percent are sufficient in most cases, and, as previously mentioned, weight ratios of bactericide to potentiating agent of from about 1:100 to 10:1 are preferred although, of course, amounts of the potentiating agent in excess of 1:100 can be used in the compositions since the potentiating agents exhibit other highly useful properties such as sequestration and deflocculations, and can also be used in the compositions for these additional properties.

A further understanding of the improved antiseptic compositions described herein and processes for preparing the compositions will be obtained from the following specific examples which are intended to illustrate this invention, but not to limit the scope thereof, with parts and percentages being by weight unless otherwise indicated.

EXAMPLE 7

A disinfectant composition is prepared formulated as follows:

| Additive | Parts |
|---|---|
| amino tri(methylene phosphonic acid) | 10 |
| phenol | 1 |

The above composition when diluted in water to about 1:1,000 increases the activity of the bactericide over 4 fold. The test procedure for this example is to serially dilute (1:2) the bactericide being tested with thioglycollate broth. The potentiating agent is then added to one-half of the tubes. The tubes are inoculated with 18 hour Staphylococcus aureus, incubated at 37° C and observed daily for growth for 120 hours.

The above composition can be used advantageously in disinfecting applications such as for disinfecting hospital equipment, utensils and the like.

In addition, good results can be obtained by using in substantially similar amounts other phenolic bactericides such as 1,3-bis(p-hydroxyphenol)butane; p-chlorophenol methyl resorcinol; 3-nitro-4-hydroxy-benzoic acid; 2,4-dinitrophenol; and the like, as well as other potentiating agents such as amino tri(ethylidene phosphonic acid); amino mono(methylene phosphonic acid) di(ethylidene phosphonic acid); methylene diphosphonic acid; 1-hydroxy, ethylidene diphosphonic acid; and the like.

EXAMPLE 8

A disinfectant composition is prepared formulated as follows:

| Additive | Parts |
|---|---|
| amino tri(methylene phosphonic acid) | 10 |
| mixture of dodecyl-, tetradecyl-, hexadecyl- and octadecyl-, dimethyl benzyl ammonium chloride | 1 |

The above composition when diluted in water to about 1:1,000 increases the activity of the bactericide over 4 fold. The test pressure being the same as set forth in Example 7.

The above composition can be used advantageously in disinfecting applications such as for disinfecting hospital equipment, utensils and the like.

In addition, good results can be obtained by using in substantially similar amounts other quaternary ammonium bactericides such as diethyl-pentadecyl-benzyl ammonium chloride; trimethyl-decyltolyl-methyl ammonium chloride; N-pentyl-N-benzyl-N-chloro-dodecyl-glycinamide; N-diethyl-N-benzyl-N-(3-butyloxyphenoxyethyl)-ammonium chloride; tributyl-hydroxyethyl-dodecylthio-methyl- ammonium chloride; 1-hexadecyl pyridinium chloride; and the like, and potentiating agents such as amino tri-(isopropylidene phosphonic acid); amino di(methylene phosphonic acid) mono(ethylidene phosphonic acid); methylene diphosphonic acid; 1-hydroxy, ethylidene di-phosphonic acid, and the like.

EXAMPLE 9

A heavy-duty antiseptic detergent composition is prepared formulated as follows:

| Additive | Parts |
|---|---|
| anionic organic active (sodium cocco fatty alcohol sulfate | 30 |
| sodium pentachlorophenate | 2 |
| tetrasodium 1-hydroxyethylidene diphosphonate | 2 |
| sodium tripolyphosphate | 38 |
| Na$_2$CO$_3$ | 15 |
| Na$_2$SO$_4$ | 12 |
| sodium carboxymethylcellulose | 1 |

The above composition is prepared by either admixing the above additives to form a dry, granular admixture or admixing the above additives in an aqueous medium sufficient to give a slurry of about 50 percent by weight solids and then drying the slurry by conventional means such as drum drying, spray drying and the like.

The above composition, when diluted in water to about 0.2 percent concentration, exhibits greater bactericidal activity than some composition without the tetrasodium 1-hydroxy ethylidene diphosphonate and can advantageously be used in commercial laundries and the like for laundrying bed sheets, diapers and the like.

In addition, good results can be obtained by using in substantially similar amounts other phenolic bactericides such as sodium 2,4,6-trichlorophenate; sodium 3-methyl-p-chlorophenate; sodium 2,2'-methylene bis(4-chloro-3,5-xylenate); sodium m-hydroxy benzoate, and the like, and potentiating agents such as penta sodium amino tri(methylene phosphonate); penta sodium amino tri(ethylidene phosphonate); tetrasodium methylene diphosphonate; tetrasodium isopropylidene diphosphonate and the like.

EXAMPLE 10

A heavy-duty antiseptic detergent composition is prepared formulated as follows:

| Additive | Parts |
| --- | --- |
| anionic organic active (sodium dodecyl-benzene sulfonate) | 30 |
| 2,2'-methylene bis(3,4,6-trichloro phenol) | 2 |
| pentasodium amino tri(methylene phosphonate) | 30 |
| Na$_2$CO$_3$ | 15 |
| Na$_2$SO$_4$ | 22 |
| sodium carboxymethylcellulose | 1 |

The above composition is prepared by either admixing the above additives to form a dry, granular admixture or admixing the above additives in an aqueous medium sufficient to give a slurry of about 50 percent by weight solids and then drying the slurry by conventional means such as drum-drying, spray-drying and the like.

The above composition when diluted in water to about 0.2 percent concentration exhibits greater bactericidal activity than the same composition without the pentasodium amine tri(methylene phosphonate) and can advantageously be used in commercial laundries and the like for laundrying bed sheets, diapers and the like.

In addition, good results can be obtained by using in substantially similar amounts other phenolic bactericides such as 2,2-thio bis(4,6-dichlorophenol); 2,2'-methylene bis(3-trifluoro methyl-4-chlorophenol); butylphenol; o-bromophenol; 4-n-hexylpyrogallol; ethyl-p-amino phenol and the like, and potentiating agents such as pentasodium amino tri(ethylidene phosphonate); penta sodium amino tri(isoprylidine phosphonate); tetrasodium methylene diphosphonate; tetrasodium 1-hydroxy, ethylidene diphosphonate and the like.

EXAMPLE 11

A liquid antiseptic detergent composition is prepared formulated as follows:

| Additive | Parts |
| --- | --- |
| water | 46.1 |
| sodium carboxymethylcellulose (95% by weight) | .5 |
| fluorescent dye | .025 |
| disodium acid pyrophosphate | 5.0 |
| nonionic organic active (nonyl phenol-ethylene oxide condensate) | 10.0 |
| maleic anhydride-ethylene copolymer | 1.0 |
| pentasodium amino tri(methylene phosphonate) | 20.0 |
| potassium hydroxide (45% by weight) | 6.7 |
| sodium silicate (Na$_2$O:SiO$_2$ of 1:2) (44.1% by weight) | 10.0 |
| dodecyl-dimethyl methylallyl ammonium chloride | 1.0 |

The above composition is prepared by heating the water to about 60° C and thereafter adding the above additives to the water in a mixer in their above listed order, each additive being added and mixed under high shear agitation over a period of about 1 to about 7 minutes while ensuring that the temperature of the mix does not exceed about 80°C.

The above composition when diluted in water to about 0.2 percent concentration exhibits greater bactericidal activity than the same composition without pentasodium amino tri(methylene phosphonate) and can advantageously be used for laundering textiles in relatively cold water and the like.

In addition, good results can be obtained by using in substantially similar amounts other quaternary ammonium bactericides such as dipropyl-phenylethyl-dodecyl ammonium chloride; dimethyl-hexadecyl-ethyl benzyl ammonium chloride; N-diethyl-N-benzyl-N-(3-butyloxy phenoxyethyl)-ammonium chloride; trimethyl-dodecyl-thiomethyl-ammonium chloride; 1-hexadecylpyridinium chloride, and the like, and potentiating agents such as pentasodium amino tri-ethylidene phosphonate); penta sodium into amino tri(isoprylidino phosphonate); tetrasodium methylene diphosphonate; tetrasodium 1-hydroxy, ethylidene diphosphonate and the like.

EXAMPLE 12

An antiseptic shampoo composition is prepared formulated as follows:

| Additive | Parts |
| --- | --- |
| triethanol lauryl sulfate | 60 |
| methyl cellulose | 2 |
| propylene glycol | 4 |
| potassium stearate | 6 |
| water | 128 |
| 2,2'-methylene bis(3,4,6-trichloro phenol) | 2 |
| tetrapotassium 1-hydroxy ethylidene diphosphonate | 2 |

The above composition is prepared by melting the potassium stearate at about 60° C to 70° C and adding thereto the triethanol lauryl sulfate, methyl cellulose, propylene glycol, 2,2'-methylene bis(3,4,6-trichlorophenol) and tetrapotassium 1-hydroxyethylidene diphosphonate until the mixture is well mixed and blended and thereafter adding the water in such a manner as to prevent aeration.

The above composition when diluted with water to about 0.2 percent concentration exhibits greater bactericidal activity than the same composition without the tetrapotassium 1-hydroxy ethylidene diphosphonate and, in addition, exhibits good hair cleansing properties.

In addition, good results can be obtained by using in substantially similar amounts other phenolic bactericides such as 2,2'-methylene bis(4-chlorophenol); 2,2'-methylene bis(4-chloro-3,5-xylenol); p-chlorophenol; 2,4,6-trichlorophenol; o-aminophenol; 2,4-dinitrophenol and the like, and potentiating agents such as penta sodium amino tri(methylene phosphonate); penta sodium amino tri(ethylidene phosphonate); tetrasodium methylene diphosphonate; tetrasodium isopropylidene diphosphonate, and the like.

EXAMPLE 13

An antiseptic mouthwash composition is prepared formulated as follows:

| Additive | Parts |
| --- | --- |
| ethyl alcohol | 10 |
| saccharin | .1 |
| 2,2'-methylene bis(3,4,6-trichlorophenol) | .1 |
| pentasodium amino tri(methylene phosphonate) | .2 |
| sodium lauryl sulfate | .2 |
| water | 89.4 |

The above composition is prepared by adding the ethyl alcohol, saccharin, 2,2'-methylene bis(3,4,6-trichlorophenol), pentasodium amino tri(methylene phosphonate) and sodium lauryl sulfate to the water. This composition when diluted with water at about 1:20 is an effective mouthwash and exhibits greater bactericidal activity than the same composition without pentasodium amino tri(methylene phosphonate).

In addition, good results can be obtained by using in substantially similar amounts other phenolic bactericides such as 2,2'-methylene bis(4-chlorophenol); 2,2'-methylene bis(4-chloro-3,5-xylenol); p-chlorophenol; 2,4,6-trichlorophenol; o-aminophenol; 2,4-dinitrophenol and the like, and potentiating agents such as amino tri-(isopropylidene phosphonic acid); amino di(methylene phosphonic acid) mono(ethylidene phosphonic acid); methylene diphosphonic acid; 1-hydroxy, ethylidene di-phosphonic acid, and the like.

EXAMPLE 14

An antiseptic detergent composition is prepared formulated as follows:

| Additive | Parts |
|---|---|
| soap comprised of sodium salts of fatty acids whose fatty acid content analyzes about 45% oleic and linoleic, 30% palmitic, 10% stearic and 15% lower fatty acids | 92 |
| pentasodium amino tri(methylene phosphonate) | 6 |
| 2,2'-methylene bis(4,6-dichloro phenol) | 2 |

The above composition is prepared by melting the soap in a suitable vessel at about 60° C to 70° C and adding the pentasodium amino tri(methylene phosphonate) and 2,2'-thio bis(4,6-dichlorophenol) to the soap with agitation. The admixture is then poured into a suitable mold and allowed to solidify by cooling to room temperature (about 25° C).

The above composition when diluted in water to about 0.2 percent concentration exhibits greater bactericidal activity than the same composition without pentasodium amino tri(methylene phosphonate) and is an effective cleanser for hand washing and the like.

In addition, good results can be obtained by using in substantially similar amounts other phenolic bactericides such as 2,2'-methylene bis(3,4,6-trichlorophenol); 2,2-methylene bis-(4-chloro-3,5-xylenol); 2,2'-ethylidene bis(3,4,6-trichlorophenol); 6diethylmethyl-3-methyl-p-chlorophenol and the like, and potentiating agents such as penta sodium amino tri(ethylidene phosphonate); tetrasodium methylene diphosphonate; tetrasodium isopropylidene diphosphonate, and the like.

EXAMPLE 15

An anteseptic detergent composition is prepared formulated as follows:

| Additive | Parts |
|---|---|
| soap comprised of sodium salts of fatty acids derived from coconut oil (primarily lauric acid) 15 to 20% sodium salts of fatty acids derived from tallow (approximately 40% stearic acid, 30% oleic acid and 30% palmitic acid) 80 to 85% | 94 |
| penta sodium amino tri(methylene phosphonate) | 4 |
| 2,2'-methylene bis(3,4,6-trichloro phenol) | 2 |

The above composition is prepared by melting the soap in a suitable vessel at about 60° C to 70° C and adding the penta sodium amino tri(methylene phosphonate) and 2,2'-methylene bis(3,4,6-trichlorophenol) to the soap with agitation. The admixture is then poured into a suitable mold and allowed to solidify by cooling to room temperature (about 25° C).

The above composition when diluted in water to about 0.2 percent concentration exhibits greater bactericidal activity then the same composition without pentasodium amino tri(methylene phosphonate) and is an effective cleanser for hand washing and the like.

In addition, good results can be obtained by using in substantially similar amounts other phenolic bactericides such as 2,2'-methylene bis(4-chlorophenol); 2,2'-methylene bis(4-chloro-3,5-xylenol); p-chlorophenol; 2,4,6-trichlorophenol; o-aminophenol; 2,4-dinitrophenol and the like, and potentiating agents such as amino tri(isopropylidene phosphonic acid); amino di(methylene phosphonic acid) mono(ethylidene phosphonic acid); methylene diphosphonic acid; 1-hydroxy, ethylidene di-phosphonic acid, and the like.

EXAMPLE 16

A detergent-sanitizer composition is prepared formulated as follows:

| Additive | Parts |
|---|---|
| nonionic organic active (nonyl phenol-ethylene oxide condensate) | 10 |
| hexadecyl-dimethyl-benzyl ammonium chloride | 10 |
| sodium carbonate (light density) | 30 |
| tetrasodium pyrophosphate | 40 |
| tetrasodium 1-hydroxy, ethylidene diphosphonate | 10 |

The above composition is prepared by admixing hexadecyl-dimethyl-benzyl ammonium chloride, sodium carbonate, tetrasodium pyrophosphonate and tetrasodium 1-hydroxy, ethylidene diphosphonate to form a granular admixture, and slowly adding the nonionic organic active under agitation in order to absorb the nonionic on the granular admixture.

The above composition when diluted in water to about 0.2 percent concentration exhibits greater bactericidal activity than the same composition without tetrasodium 1-hydroxy, ethylidene phosphonate and is an effective cleanser and sanitizer for milk cans, dairy equipment and the like.

In addition, good results can be obtained by using in substantially similar amounts other quaternary ammonium bactericides such as dipropyl-phenylethyl-dodecyl ammonium chloride; dimethyl-hexadecyl-ethyl benzyl ammonium chloride; N-diethyl-N-benzyl-N-(3-butyloxy phenoxyethyl)-ammonium chloride; trimethyl-dodecylthiomethyl-ammonium chloride; 1-hexadecyl pyridinium chloride, and the like, and potentiating agents such as pentasodium amino tri(methylene phosphonate); pentasodium amino tri(ethylidene phosphonate); tetrasodium methylene diphosphonate; tetrasodium isopropylidene diphosphonate, and the like.

EXAMPLE 17

An antiseptic bottle washing composition is prepared as follows:

| Additive | Parts |
|---|---|
| sodium hydroxide | 62 |
| sodium gluconate | 30 |
| tetrasodium methylene diphosphonate | 6 |
| diethyl-pentadecyl-benzyl ammonium chloride | 2 |

The above composition when diluted in water to about 2 percent concentration exhibits greater bactericidal activity than the same composition without tetrasodium methylene diphosphonate and is an effective cleanser for washing milk bottles, beer bottles, and the like.

In addition, good results can be obtained by using in substantially similar amounts other quaternary ammonium bactericides such as dipropyl-phenylethyl-dodecyl ammonium chloride; dimethyl-hexadecyl-ethyl benzyl ammonium chloride; N-diethyl-N-benzyl-N-(3-butyloxy phenoxyethyl)-ammonium chloride; trimethyl-dodecylthiomethyl-ammonium chloride; 1-hexadecyl pyridinium chloride, and the like, and potentiating agents such as amino tri(methylene phosphonic acid); amino tri-(ethylidene phosphonic acid); 1-hydroxy ethylidene di-phosphonic acid, and the like.

EXAMPIE 18

An antiseptic bottle washing composition is prepared as follows:

| Additive | Parts |
|---|---|
| sodium hydroxide | 58 |
| pentasodium amino tri(methylene phosphonate) | 30 |

| | |
|---|---|
| sodium silicate (Na$_2$O:SiO$_2$ of 1:2) | 10 |
| dimethyl-dodecyl-benzyl ammonium chloride | 2 |

In addition, good results can be obtained by using in substantially similar amounts other quaternary ammonium bactericides such as dipropyl-phenylethyl-dodecyl ammonium chloride; dimethyl-hexadecyl-ethyl benzyl ammonium chloride; N-diethyl-N-benzyl-N-(3-butyloxy phenoxyethyl)-ammonium chloride; trimethyl- dodecylthiomethyl-ammonium chloride; 1-hexadecyl pyridinium chloride, and the like, and potentiating agents such as pentasodium amino tri(methylene phosphonate); pentasodium amino tri(ethylidene phosphonate); tetrasodium methylene diphosphonate; tetrasodium isopropylidene di-phosphonate, and the like.

The above composition when diluted in water to about 2 percent concentration exhibits greater bactericidal activity than the same composition without pentasodium amino tri(methylene phosphonate) and is an effective cleanser for washing milk bottles, beer bottles and the like.

EXAMPLE 19

An antiseptic toothpaste is prepared formulated as follows:

| Additive | Parts |
|---|---|
| glycerine (95% by weight) | 270 |
| carboxymethyl cellulose | 9 |
| water | 180 |
| sodium lauryl sulfate | 20 |
| dicalcium phosphate dihydrate | 450 |
| saccharin | 5 |
| pentasodium amino tri(methylene phosphonate) | 10 |
| 2,2-methylene bis(3,4,6-trichloro phenol) | 1 |

The above composition is prepared by heating the glycerine in a suitable mixer and adding the carboxymethyl cellulose under gentle mixing. The water is then added and the heating and mixing is continued until the temperature reaches about 70° C. After mixing for about 5 minutes the sodium lauryl sulfate is added and the mixing continued for about 5 more minutes. The heating is discontinued and the dicalcium phosphate dihydrate is added in suitable portions and is thoroughly mixed into the paste. The paste is cooled at such a rate as will reduce the temperature to about 32° C in about 45 minutes and the mixing is continued for an additional 15 minutes at about 30° C to 32° C. The flavor is then thoroughly mixed into the paste and the paste can be put into tubes by conventional methods.

The above composition exhibits greater bactericidal activity than the same composition without pentasodium amino tri(methylene phosphonate) at concentrations normally used in brushing teeth.

In addition, good results can be obtained by using in substantially similar amounts other phenolic bactericides such as 2,2-methylene bis(3,4,6-trichloro-phenol); 2,2-methylene bis-(4-chloro-3,5-xylenol); 2,2'-ethylidene bis(3,4,6-trichlorophenol); 6-diethylmethyl-3-methyl-p-chlorophenol and the like, and potentiating agents such as pentasodium amino tri(ethylidene phosphonate) ; tetrasodium methylene diphosphonate; tetrasodium isopropylidene diphosphonate, and the like.

EXAMPLE 20

A disinfecting composition is prepared formulated as follows:

| Additive | Parts |
|---|---|
| sodium metasilicate | 70 |
| butylidene diphosphonic acid | 29 |
| N-pentyl-N-benzyl-N-chloro-dodecyl-glycinamide | 1 |

The above composition when in water at about 0.25 percent concentration kills entirely at about 50° C, a deposit of bacteria coli in about 4 minutes while the above composition, without the butylidene diphosphonic, under the same conditions takes more than about 6 minutes to kill a deposit of bacteria coli.

In addition, good results can be obtained by using in substantially similar amounts other quaternary ammonium bactericides such as N-trimethyl-N-chloro-N'-dodecyl-glycinamide; N-dimethyl-N-benzyl-N-chloro-dodecyl-glycinamide; N-methyl-N-benzyl-N-cyclohexyl-N-chloro-N'-dodecyl-glycinamide and the like, and potentiating agents such as pentasodium amino tri(methylene phosphonate); pentasodium amino tri(ethylidene phosphonate); tetrasodium methylene diphosphonate; tetrasodium sopropylidene diphosphonate, and the like

EXAMPLE 21

To about one part of "soya" amine is added about 4.5 parts of sodium carbonate, about 5 parts of methylene diphosphonic acid and about 5 parts of tri-sodium phosphate. Soya amine is a mixture of trimethyl alkyl ammonium chloride. The alkyl groups are derived from the following acids: approximately 6.5 percent palmitic, 4.5 percent stearic, 43.5 percent 52.5 percent linoleic and 2.3 percent linoleic.

The admixture when diluted to about 1000 parts with water produces a solution which exhibits greater bactericidal activity than the same composition without methylene diphosphonic acid and can advantageously be used in cleaning dairy plant equipment such as large vats and pipelines.

In addition, good results can be obtained by using in substantially similar amounts other quaternary ammonium bactericides such as dimethyl-decyl-benzyl ammonium chloride; diethyl-dodecyl-benzyl ammonium chloride; diethyl-pentadecyl-benzyl ammonium chloride; dimethyl-ditetradecyl ammonium chloride, and the like, and potentiating agents such as 1-hydroxy, propylidene diphosphonic acid; isopropylidene diphosphonic acid; amino di-(methylene phosphonic acid) mono-(ethylidene phosphonic acid) and the like.

EXAMPLE 22

To about 1 part of dodecyl dimethyl benzyl ammonium chloride is added about 4.5 parts potassium carbonate, and about 5 parts amino tri(methylene phosphonic acid).

The admixture when diluted to about 1000 parts with water produces a solution which exhibits greater bactericidal activity than the same composition without amino tri-methylene phosphonic acid) and can advantageously be used in cleaning dairy plant equipment such as large vats and pipelines.

In addition, good results can be obtained by using in substantially similar amounts other quaternary ammonium bactericides such as dimethyl-decyl-benzyl ammonium chloride; diethyl-dodecyl-benzyl ammonium chloride; diethyl-pentadecyl-benzyl ammonium chloride; di-methyl-ditetradecyl ammonium chloride, and the like, and potentiating agents such as 1-hydroxy, propylidene di-phosphonic acid; isopropylidene diphosphonic acid; amino di-(methylene phosphonic acid) mono(ethylidene phosphonic acid) and the like.

EXAMPLE 23

To about one part of "tallow" amine is added about 4.5 parts of sodium carbonate, about 5 parts of tetrasodium 1-hydroxy, ethylidene diphosphonate and about 5 parts trisodium phosphate. Tallow amine is a mixture of trimethyl alkyl ammonium chloride. The alkyl group is derived from the following acids: approximately 3 percent myristic, 29 percent palmitic, 18.5 percent stearate, 46.5 oleic, and 3.0 percent linoleic.

In addition, good results can be obtained by using in substantially similar amounts other quaternary ammonium bactericides such as dimethyl-decyl-benzyl ammonium chloride; diethyl-dodecyl-benzyl ammonium chloride; diethyl-pentadecyl-benzyl ammonium chloride; di-methyl-ditetradecyl ammonium chloride, and the like, and potentiaing agents such as 1-hydroxy, propylidene diphosphonic acid; isopropylidene diphosphonic acid; amino di-(methylene phosphonic acid) mono(ethylene phosphonic acid) and the like.

This admixture when diluted to about 1000 parts with water produces a clear solution and exhibits greater bactericidal activity than the same composition without tetrasodium 1-hydroxy, ethylidene diphosphonate and can advantageously be used in cleaning dairy plant equipment such as large vats and pipelines.

EXAMPLE 24

About 2 parts of hexylphenol, about 5 parts of amino tri(methylene phosphonic acid) and about 93 parts of 91 percent strength iso-propyl alcohol. About 1 part of this admixture is mixed with 50 parts of water and yields a clear transparent solution which is strongly antiseptic. Its effectiveness against Staphylococcus aureus is four fold over a similar admixture which does not contain the amine tri(methylene phosphonic acid).

The above composition can advantageously be used for the disinfecting of hospital equipment, instruments, utensils, and the like.

In addition, good results can be obtained by using in substantially similar amounts other phenolic bactericides such as butylphenol, amylphenol, heptyl-phenol, octylphenol and the like, and potentiating agents such as amino tri(isopropylidene phosphonic acid); amino di(methylene phosphonic acid) mono(ethylene phosphonic acid); methylene diphosphonic acid; 1-hydroxy, ethylidene diphosphonic acid, and the like.

EXAMPLE 25

An antiseptic drilling mud composition is prepared as follows:

| Additive | Parts |
| --- | --- |
| clay—blend of one part Wyoming bentonite, four parts Dixie bond clay, and 10 parts Tennessee ball clay | 10 |
| sodium hydroxide | .4 |
| starch | 2 |
| sodium pentachlorophenol | .4 |
| pentasodium amino tri(methylene phosphonate) | 1 |
| water | sufficient to give 35% solids slurry |

The above additives when blended to form a slurry, exhibit, as a drilling mud composition, good properties for such use.

In addition, good results can be obtained by using in substantially similar amounts other phenolic bactericides such as 2,4,6-trichlorophenol; n-hexyl-o-bromophenol, tetrachlorophenol and the like, and potentiating agents such as tetrasodium methylene diphosphonate, tetrasodium 1-hydroxy, ethylidene diphosphonate and the like.

EXAMPLE 26

An antiseptic lime treated drilling mud composition is prepared as follows:

| Addition | Parts |
| --- | --- |
| clay—blend of one part Wyoming bentonite, four parts Dixie bond clay and 10 parts Tennessee ball clay | 10 |
| calcium hydroxide | 1 |
| starch | 2 |
| quebracho | 2 |
| sodium pentachlorophenol | .4 |
| tetrasodium 1-hydroxy ethylidene diphosphonate | .8 |
| water | sufficient to give 35% solids slurry |

The above additives when blended to form a slurry, exhibit, as a drilling mud composition, good properties for such use.

In addition, good results can be obtained by using in substantially similar amounts other phenolic bactericides such as, 2,4,6-trichlorophenol; n-hexyl-o-bromophenol, tetrachlorophenol and the like, and potentiating agents such as pentasodium amino tri(methylene phosphonate), tetrasodium methylenediphosphate and the like.

We claim:

1. An antiseptic composition comprising a bactericide selected from the class consisting of phenolic bactericides and, as a potentiating agent, a water-soluble polyphosphonic acid compound having the formula

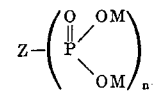

wherein n is an integer from 2 to 3 inclusive, M is a member selected from the group consisting of hydrogen, alkali metal ions, ammonium ions and amine ions, and Z is a connecting radical equal in valence to n and containing from about 1 to about 12 atoms, exclusive of hydrogen, in chemical combination, and is selected from the group consisting of alkylidene radicals, halo-substituted alkylidene radicals, hydroxy-substituted alkylidene radicals, alkylidene amine radicals, dialkylidene amine radicals, and trialkylidene amine radicals, with the proviso that said potentiating agent is present in an amount sufficient to improve the activity of said bactericide.

2. An antiseptic composition comprising a bactericide selected from the class consisting of phenolic bactericides and, as a potentiating agent, a water-soluble amino tri(lower alkylidene phosphonic acid) compound having the formula

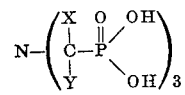

wherein X and Y are members selected from the group consisting of hydrogen and lower alkyl, and M is a member selected from the group consisting of hydrogen, alkali metal ions, ammonium ions and amine ions, with the proviso that said potentiating agent is present in an amount sufficient to improve the activity of said bactericide.

3. The composition of claim 2, wherein said potentiating agent is pentasodium amino tri(methylene phosphonate).

4. An antiseptic composition comprising a bactericide selected from the class consisting of phenolic bactericides and, as a potentiating agent, a water-soluble lower alkylidene diphosphonic acid compound having the formula

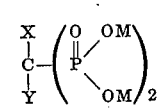

wherein x is a member selected from the group consisting of hydrogen and lower alkyl, Y is a member selected from the group consisting of hydrogen, hydroxyl and lower alkyl, and M is a member selected from the group consisting of hydrogen, alkali metal ions, ammonium ions and amine ions, with the proviso that said potentiating agent is present in an amount sufficient to improve the activity of said bactericide.

5. The composition of claim 4, wherein said potentiating agent is tetrasodium 1-hydroxy, ethylidene diphosphonate.

* * * * *